United States Patent [19]

Appleford

[11] Patent Number: 5,270,931
[45] Date of Patent: Dec. 14, 1993

[54] SOFTWARE CONTROLLED AIRCRAFT COMPONENT CONFIGURATION SYSTEM

[75] Inventor: Lyle R. Appleford, Seattle, Wash.

[73] Assignee: The Boeing Company, Seattle, Wash.

[21] Appl. No.: 852,911

[22] Filed: Mar. 12, 1992

Related U.S. Application Data

[63] Continuation of Ser. No. 315,947, Feb. 23, 1989, abandoned.

[51] Int. Cl.$^5$ .................. G06F 15/20; G11C 11/40
[52] U.S. Cl. .................. 364/424.01; 364/424.03; 364/424.04; 364/245; 365/228
[58] Field of Search .................. 365/228, 229; 364/424.01, 424.02, 424.06, 424.12, 245, DIG. 1

[56] References Cited

U.S. PATENT DOCUMENTS

| | | | |
|---|---|---|---|
| 3,827,030 | 7/1974 | Seipp | 340/172.5 |
| 3,842,249 | 10/1974 | Geyer et al. | 235/151.21 |
| 4,107,784 | 8/1978 | Van Bemmelen | 364/900 |
| 4,200,914 | 4/1980 | Kintner | 364/900 |
| 4,399,502 | 8/1983 | MacDonald et al. | 364/189 |
| 4,430,584 | 2/1984 | Someshwar et al. | 307/465 |
| 4,431,988 | 2/1984 | Molusis et al. | 340/712 |
| 4,443,861 | 4/1984 | Slater | 364/900 |
| 4,589,066 | 5/1986 | Lam et al. | 364/200 |
| 4,715,016 | 12/1987 | Lamiaux et al. | 365/228 |
| 4,729,102 | 3/1988 | Miller, Jr. et al. | 364/424.06 |
| 4,744,062 | 5/1988 | Nakamura et al. | 365/228 X |
| 4,751,670 | 6/1988 | Hess | 364/424.06 |
| 4,943,919 | 7/1990 | Aslin et al. | 364/424.01 |

OTHER PUBLICATIONS

E. E. Forster, "A Programmable Display Test Unit", *IEEE Transactions On Instrumentation And Measurements*, Jun. 1978.

I. Jones, Programmable Keytop Employing Electrochromic Display, *IBM Technical Disclosure Bulletin*, vol. 21, No. 4, Sep. 1978.

*Primary Examiner*—Alyssa H. Bowler
*Attorney, Agent, or Firm*—Dellett and Walters

[57] ABSTRACT

Configuration options for aircraft components are stored in non-volatile reprogrammable memory and selected by way of software under secure conditions without requiring configuration pins. Aircraft components can be reconfigured without taking the aircraft out of service for more than a few minutes.

17 Claims, 8 Drawing Sheets

Fig.1

```
            INIT/REF INDEX        1/1
1L   <IDENT                NAV DATA>   1R

2L   <POS                              2R

3L   <PERF                             3R

4L   <TAKEOFF                          4R

5L   <APPROACH              IRS NAV>   5R

6L                            MAINT>   6R
```

Fig. 2

```
            MAINT BITE INDEX     1/1
1L   <FMCS                             1R

2L   <DFCS                             2R

3L   <A/T                              3R

4L   <IRS                              4R

5L   <EFIS                             5R

6L   <INDEX                            6R
```

| | FMCS CONFIGURATION OPTIONS DISCRETES 1/3 | | |
|---|---|---|---|
| 1L | CAA FLIGHT RULES | DISABLE | 1R |
| 2L | DEGREES C/ DEGREES F | DEGREES C | 2R |
| 3L | EFIS INSTALLED | OFF | 3R |
| 4L | FLIGHT NUMBER ENTRY | ENABLE | 4R |
| 5L | FREQ SCANNING DME | DISABLE | 5R |
| 6L | <INDEX | | 6R |

Fig. 5

| | FMCS CONFIGURATION OPTIONS DISCRETES 2/3 | | |
|---|---|---|---|
| 1L | KILOGRAM OPTION | DISABLE | 1R |
| 2L | NAVAID SUPPRESS | ENABLE | 2R |
| 3L | | | 3R |
| 4L | OMEGA | OFF | 4R |
| 5L | TOGA RW POSITION UPDATE | DISABLE | 5R |
| 6L | <INDEX | | 6R |

Fig. 6

```
       FMCS CONFIGURATION OPTIONS DISCRETES  3/3
[1L]   TAKEOFF PROFILE              DISABLE       [1R]

[2L]   TAKEOFF SPEEDS               DISABLE       [2R]

[3L]   VOR INHIBIT                  ENABLE        [3R]

[4L]   ASSUMED TEMPERATURE          ENABLE        [4R]

[5L]   SELECTED COURSE INHIBIT      ENABLE        [5R]

[6L]   <INDEX                                     [6R]
```

SOFTWARE CONTROLLED AIRCRAFT COMPONENT CONFIGURATION SYSTEM

This is a continuation of application Ser. No. 07/315,947 filed Feb. 23, 1989 and now abandoned.

BACKGROUND OF THE INVENTION

The present invention relates to an aircraft electronic system and particularly to a method and apparatus for configuring aircraft electronic circuitry.

An aircraft electronic system typically includes a flight management computer connected to a control display unit by means of which aircraft personnel interact with the computer through observation of screen displays and operation of input keys. The computer communicates with various sensors and control devices on the aircraft and plays a central role in coordination of aircraft operation. The flight management computer supplies computer aided data for automatically positioning the aircraft over a geographic location at a given speed, altitude and time, and also executes controlled maneuvers such as climb, descent, hold, reduced thrust take-off, and airfield approach to optimize speed and fuel consumption and minimize operational costs.

To accomplish various of these tasks, the flight management computer stores information in a navigation database. Navigation databases are usually customized for a particular airline and supply information specific to the routes taken by aircraft of that airline. Navigation databases are similar in content to aeronautical charts and approach/departure procedure plans and include a wide range of data regarding radio navigation, airport locations, airport runway configurations, airline routes, standard approaches, and standard departures. The flight management computer is suitably provided with a reprogrammable non-volatile memory (NVRAM) for storing mainly the aforementioned navigation database information. A database supplier provides the information on a tape cartridge fitting into a data loader unit which is connected to the flight management computer for transferring the navigation data from the tape cartridge to the NVRAM. Navigation databases are typically kept current by loading an updated version by tape cartridge every twenty-eight days.

Aircraft electronic systems are subject to extensive government agency regulation, and each aircraft component, such as the aforementioned flight management computer, must be certified and given a part number before installation or use in commercial aircraft. Many such components are designated with a single part number but have configuration options to suit the particular needs of different airlines. Each configuration option provides two choices, i.e., either the option is selected or not selected. To select between configuration options, the aircraft component includes a "configuration pin" for an option and this pin connects to aircraft wiring for receiving a discrete signal identifying the option choice. For example, an aircraft wire connected to a configuration pin corresponding to temperature display may be disconnected or left open to select centigrade temperature display values, and connected to ground to select Fahrenheit temperature display values. The present trend is to include more configuration options, and as the number of configuration options grows, so does the number of configuration pins for each aircraft component because a separate configuration pin is required for each pair of choices. The total number of configuration options for a given aircraft component is limited by the number of configuration pins which may be located thereon. Furthermore, additional configuration options increase the complexity of the aircraft wiring system because each configuration pin typically requires a dedicated aircraft wire to deliver the discrete signal.

The flight management computer is one example of an aircraft component having a single part number, but which may be configured according to the particular standards of the airline using the computer in its aircraft. Each airline configures all its flight management computers identically to avoid confusion and enable its pilots to change more easily between airplanes. Thus, a given airline might require the flight management computers in each aircraft to operate under CAA flight rules and also that temperature values be displayed in centigrade, while another airline might configure its flight management computers to operate under FAA flight rules and also to display temperature values in Fahrenheit. To select those options, the airline provides the suitable discrete aircraft wiring connected to configuration pins. The aircraft wiring must be certified, however, to insure that it can supply suitable values to the pins. If an airline then desires to change its configuration options, or if the aircraft is used by a different airline, it becomes necessary to rewire the aircraft in order to select the new options, and the process of re-wiring an aircraft to select new configuration options must be authorized by the regulating authority and executed according to a set of instructions set forth in a "service bulletin". Each process of rewiring can, of course, be subject to error.

A flight management computer typically includes an input circuit card with a memory device. When the flight management computer is initialized at power-up with the airplane on the ground, the input circuit card scans the configuration pins and reads the discrete signal applied to each pin. The discrete values are then written into the memory device as configuration options data, and the flight management computer accesses the memory device to determine selected configuration options during operation. Configuration options data written into the memory device is lost when the flight management computer is turned off and the airplane is on the ground.

An aircraft crew may examine the status of each configuration option through a control display unit presenting menu screens on a CRT with each selectable menu item next to an associated input button. By depressing the appropriate input buttons, aircraft crew members can page through a series of menu displays and reach a display screen showing the status of each configuration option. The crew members cannot, however, change the option status.

Aircraft manufacturers wire and certify an aircraft, or fleet of aircraft, at the time of delivery according to the needs of the purchasing airline. Heretofore, the configuration options were seldom changed once the aircraft reached the hands of the purchasing airline and the aircraft seldom changed hands once delivered. However, many airlines now lease fleets of aircraft from leasing companies, and a single aircraft may be used by different airlines from year to year. Each time an aircraft is leased and placed in the hands of a new airline it may be necessary to rewire the aircraft in order to select the set of configuration options to be used, which, although intended to insure subsequent reliability, can, as stated, be subject to error. The rewiring procedure requires a service bulletin for certification, with the aircraft being taken out of service for the expensive reconfiguration. On the other hand, while it may be desirable to make reconfiguration convenient in order to reduce aircraft out of service time, reconfiguration should not be available to each aircraft crew since this might result in subsequent misinterpretation of data and unintended operation of the aircraft.

SUMMARY OF THE INVENTION

In accordance with an embodiment of the present invention, an aircraft electronic system comprising an aircraft component such as a flight management computer is configured according to a set of certified configuration options and is provided with a reprogrammable non-volatile memory device whereby the state of the memory device determines which of said configuration options are selected. A programming device supplies configuration options data and the aircraft component receives the configuration options data and writes that data into the memory device to select among the options. The programming device includes security means for preventing unauthorized programming of the memory device.

In a principal embodiment of the present invention, the programming device comprises a control display device including input keys for providing configuration options data to the aircraft component and the security means comprises an enabler unit adapted for coupling to the aircraft component. The enabler unit has an enable state and a disable state, with the aircraft component being programmed to a permit modification of configuration option data in the memory device only when the enabler unit is coupled to the aircraft component and is in its enable state.

According to another embodiment of the present invention, an aircraft component comprises a flight management computer while the programming device is a navigation database loader unit. Configuration options data is included in the navigation database such that upon loading the navigation database into the memory device of the flight management computer, the configuration options data is also loaded into the memory device to accomplish reconfiguration of the flight management computer.

According to a further embodiment of the present invention, a dedicated data loader unit provides configuration options data to the aircraft component. The dedicated data loader unit includes a keyboard for manual entry of configuration options data and a card reader whereby configuration options data may be read from a magnetic strip, punched card, optic medium or the like for automatic transmission to the aircraft component.

It is an object of the present invention to provide convenient modification of aircraft component configuration options while insuring against unauthorized modification and maintaining strict configuration control over aircraft components.

It is a further object of the present invention to eliminate the need for configuration pins which complicate aircraft wiring systems and limit the number of configuration options as may be incorporated within a given aircraft component.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT

Figure 1:
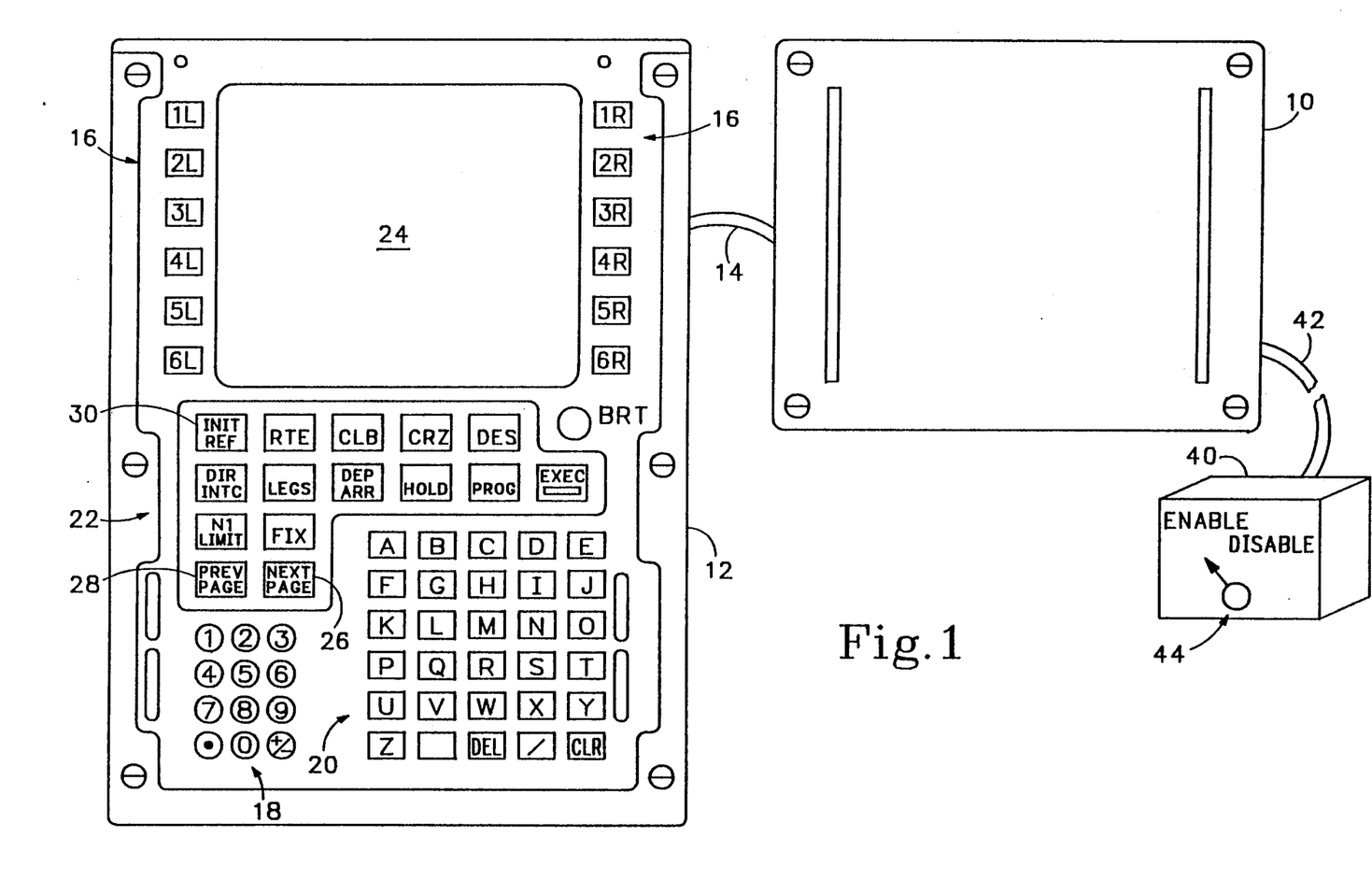
FIG 1 is an illustration of a flight management computer having configuration options, a control display unit, and an enabler unit for permitting modification of configuration options for a flight management computer.

FIG. 1 illustrates a flight management computer 10 together with a control display unit 12 interconnected by cable 14. Computer 10 and control display unit 12 form a portion of the airborne electronic system of a conventional commercial aircraft and mount within the aircraft. Control display unit 12 is a user console/display device for operation of flight management computer 10 by aircraft personnel.

Control display unit 12 is typically provided with line select keys 16, numeric keys 18, alpha keys 20, and function keys 22. In operating computer 10, aircraft personnel select functions by depressing function keys 22 and provide the input data required to execute the selected function by way of numeric keys 18 and alpha keys 20 while the flight management computer 10 displays output data on CRT 24. Line select keys 16 are organized in two columns, a left column positioned on the left side of CRT 24 and numbered 1L-6L from top to bottom, and a right column positioned on the right side of CRT 24, numbered 1R-6R from top to bottom. Menu displays appear on CRT 24 with each menu prompt next to an associated one of line select keys 16. To select a menu prompt, the operator presses the associated line select key. Some displays presented on CRT 24 are multiple screen displays. To view multiple screen displays, function keys 22 include NEXT PAGE function key 26 and PREVIOUS PAGE function key 28.

Figure 2:
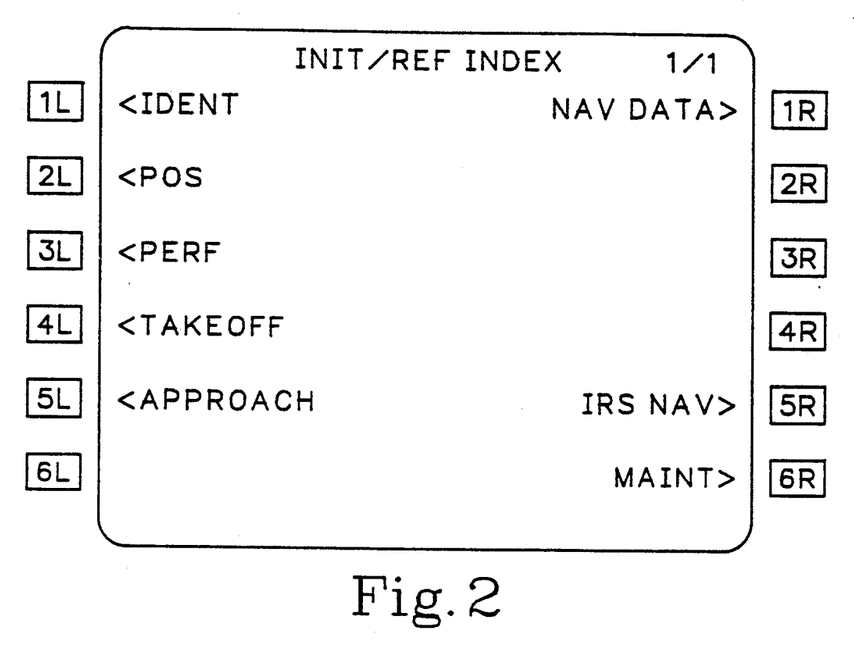
FIGS. 2—4 are menu screen displays presented on the control display unit of FIG. 1.
Figure 3:
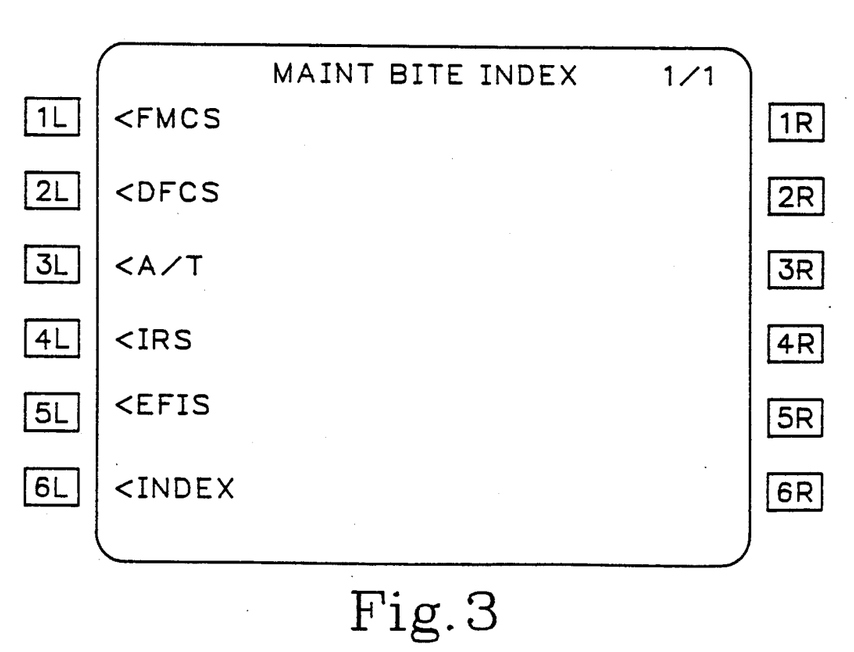

FIG. 2 illustrates a menu that is presented on CRT 24 upon depressing INIT REF function key 30. In the lower right corner of CRT 24 the prompt MAINT> appears, and the operator of control display unit 12 selects the prompt MAINT> by depressing line select key 6R. The maintenance menu shown in FIG. 3 is then displayed on CRT 24 which includes a menu choice <FMCS relating to execution of built-in test procedures for testing the flight management computer 10. The prompt <FMCS is next to line select key 1L and depressing line select key 1L generates the screen display shown in FIG. 4. The menu choices shown in FIG. 4 each pertain to built-in test procedures for flight management computer 10.

Selection of menu choice CONFIG DISC>, next to line select key 2R, causes flight management computer 10 to execute a configuration options program, described in greater detail hereinafter, which outputs the current status of each configuration option. Control display unit 12 presents this data on CRT 24 as three separate screen displays, shown in FIGS. 5–7. The operator of control display unit 12 pages through these three screen displays to view the current configuration options by pressing NEXT PAGE function key 26 and PREVIOUS PAGE function key 28. However, the operator is not permitted to change the configuration options as such reconfiguration requires authorization.

Figure 5:
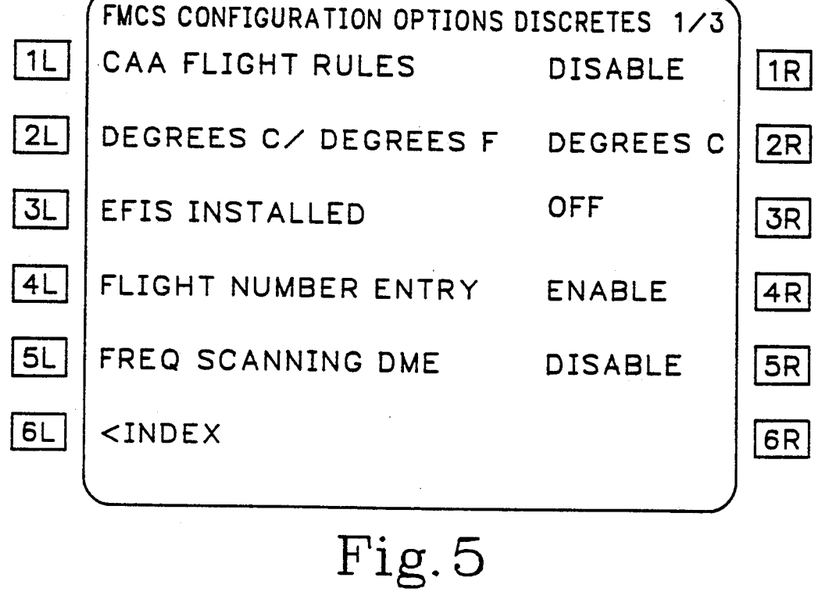
FIGS. 5–7 are screen displays presented on the control display unit of FIG. 1 showing the status of configuration options for the flight management computer of FIG. 1.
Figure 6:
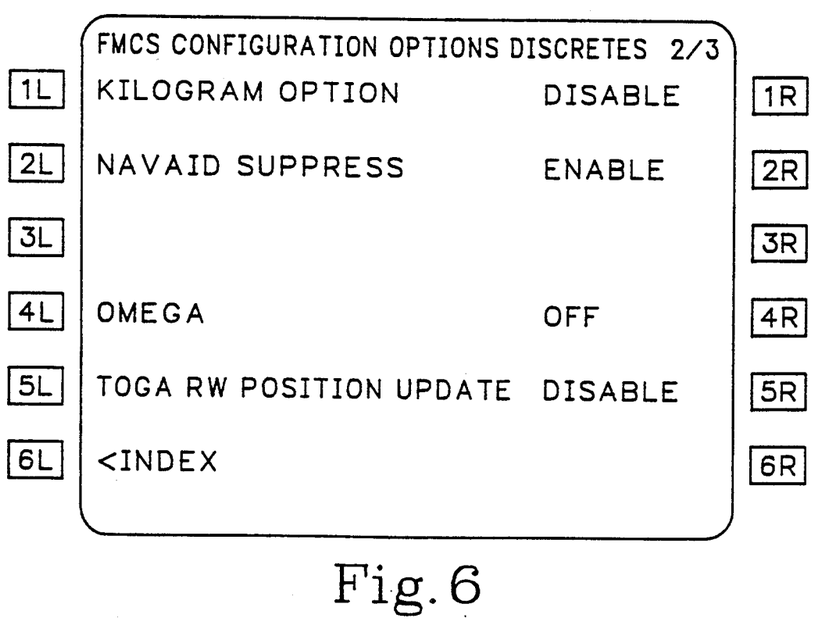
Figure 7:
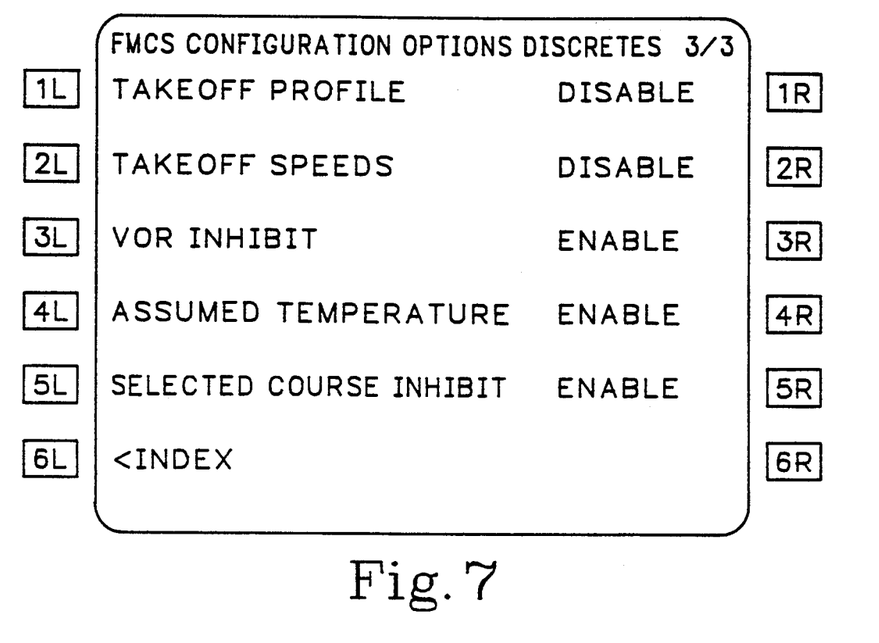

Flight management computer 10 is configured according to the particular needs of the airline using flight management computer 10 and, while the configuration options shown in FIGS. 5–7 are typical options for modern commercial aircraft, it should be understood that configuration options are not limited to those shown in FIGS. 5–7 but additional configuration options are likely to be incorporated into the aircraft. Each configuration option of FIGS. 5–7 will be described briefly to illustrate their function as related to aircraft operation.

In FIG. 5, the first configuration option CAA FLIGHT RULES determines whether flight management computer 10 operates the aircraft according to the CAA flight rules; if this option is enabled, computer 10 operates according to such flight rules, and if it is disabled, computer 10 operates according to FAA flight rules. When the second configuration option DEGREES C/DEGREES F is enabled, temperature values are displayed in centigrade, but when disabled, temperature values are displayed in Fahrenheit. The third configuration option EFIS INSTALLED informs flight management computer 10 whether an electronic flight instrument system (EFIS) is present. An EFIS is a set of CRT displays providing graphic images portraying traditionally mechanical display devices. When an EFIS is installed, this option is enabled or turned on and computer 10 supplies signals suitable for driving the EFIS. When the configuration option FLIGHT NUMBER ENTRY is enabled, a flight number can be entered into control display unit 12 and flight management computer 10 determines, from the navigation database, the route corresponding to that flight number to establish a flight plan. If frequency scanning distance measuring equipment (DME) is installed, configuration option FREQ SCANNING DME is enabled; otherwise, it is disabled.

In FIG. 6, configuration option KILOGRAM OPTION is enabled if metric system values are to be displayed, but disabled if British engineering system values, e.g. pounds, are to be displayed. Configuration option NAVAID SUPPRESS is enabled to suppress automatic display of navigation aids and disabled to provide automatic display of navigation aids. The OMEGA configuration option is disabled or off when the world-wide radio navigation system OMEGA is not used, but enabled or on when OMEGA is to be used. Configuration option TOGA RW POSITION UPDATE is enabled to instruct flight management computer 10 to use the navigation database at takeoff to derive a precise location using the airport runway data rather than the inertial reference system. When this option is disabled, flight management computer 10 employs the inertial reference system for determining position.

In FIG. 7, the configuration option TAKEOFF PROFILE is provided for noise abatement. When enabled, the pilot enters an altitude value, by way of control display unit 12, at which flight management computer 10 changes thrust limits from takeoff limits to climb limits. Configuration option TAKEOFF SPEEDS is enabled to permit entry of critical speed values for takeoff and climbout used by flight management computer 10 during takeoff and departure from an airport. Option VOR INHIBIT is enabled to prevent automatic VOR tuning; it is disabled for automatic VOR tuning. Option ASSUMED TEMPERATURE is enabled to permit the pilot to enter a modified outside air temperature in the thrust calculation, thereby providing a reduced thrust takeoff. Option SELECTED COURSE INHIBIT is enabled to prevent automatic display of the selected course on the EFIS display, being disabled for automatic display of the selected course on the EFIS display.

Figure 8:
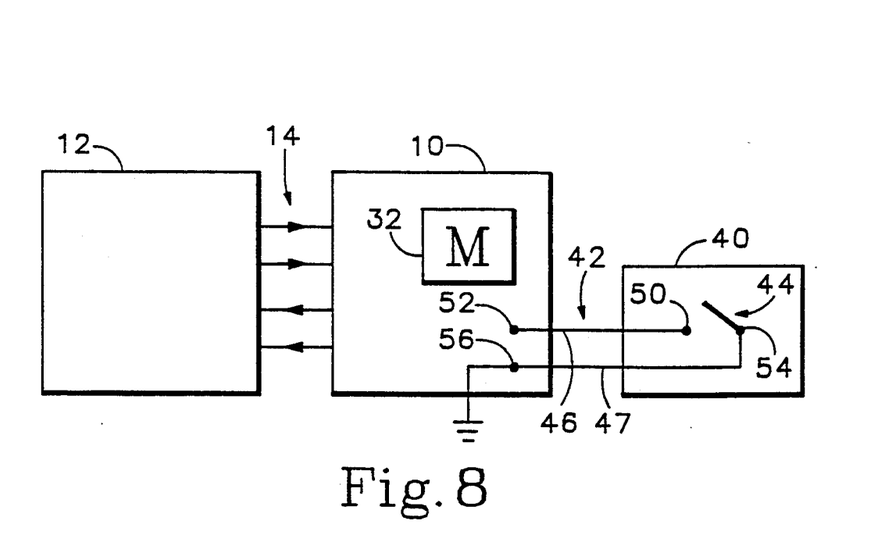
FIG. 8 is a block diagram of the flight management computer, display unit, and enabler unit of FIG. 1.

FIG. 8 is a schematic diagram including flight management computer 10 together with control display unit 12. Cable 14 interconnecting flight management computer 10 and control display unit 12 is a digital data bus comprising four data paths, two from control display unit 12 to flight management computer 10 and two from flight management computer 10 to control display unit 12. Flight management computer 10 and control display unit 12 communicate by way of the cable 14 according to the ARINC 429 standard; however, other communication standards such as DATAC are equally applicable to the present invention. Non-volatile random access memory (NVRAM) 32 stores the status of each configuration option, this information being maintained by means of battery back-up even if flight management computer 10 is without power. NVRAM 32 may be the same memory device used to store the navigation database, but with a designated portion of NVRAM 32 dedicated to configuration options data. Because each configuration option provides two choices, a single bit in NVRAM 32 is sufficient to store the choice for each configuration option.

If flight management computer 10 is to be used by a second airline or if the airline using flight management computer 10 desires to change some of the configuration options it becomes necessary to reconfigure flight management computer 10. The reconfiguration process can be quickly executed without resorting to the time consuming task of rewiring the aircraft. As a matter of fact, the aircraft need not be taken out of service for more than a few minutes. Despite the ease with which the reconfiguration process is accomplished, reconfiguration by unauthorized personnel is not possible and the configuration options are therefore secure against improper modification.

In FIG. 1, an enabler unit 40 connects to flight management computer 10 by way of cable 42 and is provided with a switch 44 having an enable position and a disable position Cable 42 may actually plug into the aircraft electronics bay console; the actual connection to flight management computer 10 then includes a portion of the aircraft wiring system. However, in the present discussion, cable 42 will be taken as the connection between enabler 40 and flight management computer 10. Referring again to FIG. 8, cable 42 comprises conductors 46 and 47, with conductor 46 coupling post 50 of switch 44 to an enable pin 52 of flight management computer 10, and conductor 47 coupling post 54 of switch 44 with ground post 56 of flight management computer 10. Enable pin 52 thus connects to ground by way of switch 44 when switch 44 is in its enable position but is left open when switch 44 is in its disable position. Flight management computer 10 is programmed to read the status of pin 52 and then permit an operator of control display unit 12 to change the status of the configuration options for flight management computer 10 only when pin 52 is connected to ground. Thus, to change the status of the configuration options for flight management computer 10, enabler unit 40 is transported into the aircraft in which flight management computer 10 is mounted and connected to flight management computer 10 by way of cable 42. Placing switch 44 in its enable position connects pin 52 to ground, informing flight management computer 10 that modification of configuration options is permitted.

Figure 4:
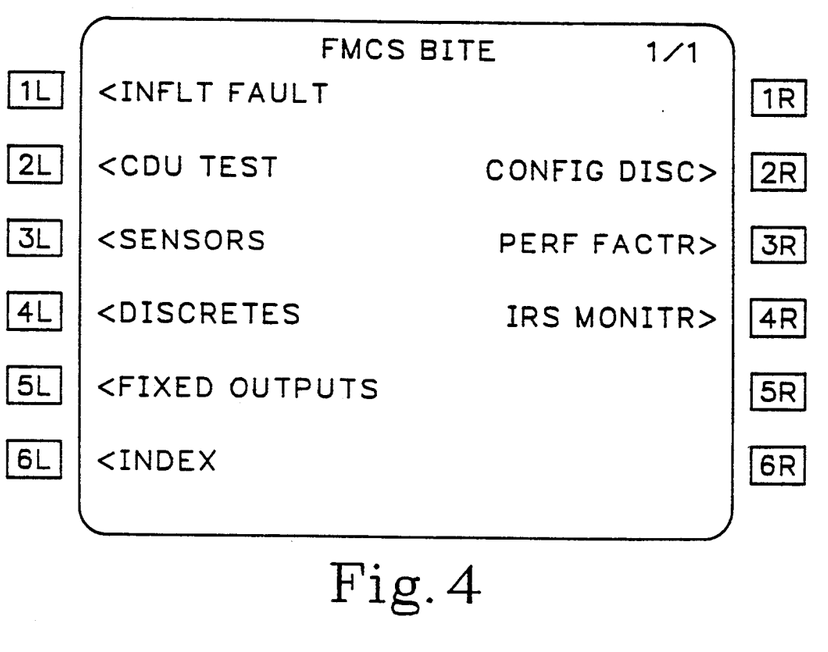
Figure 9:
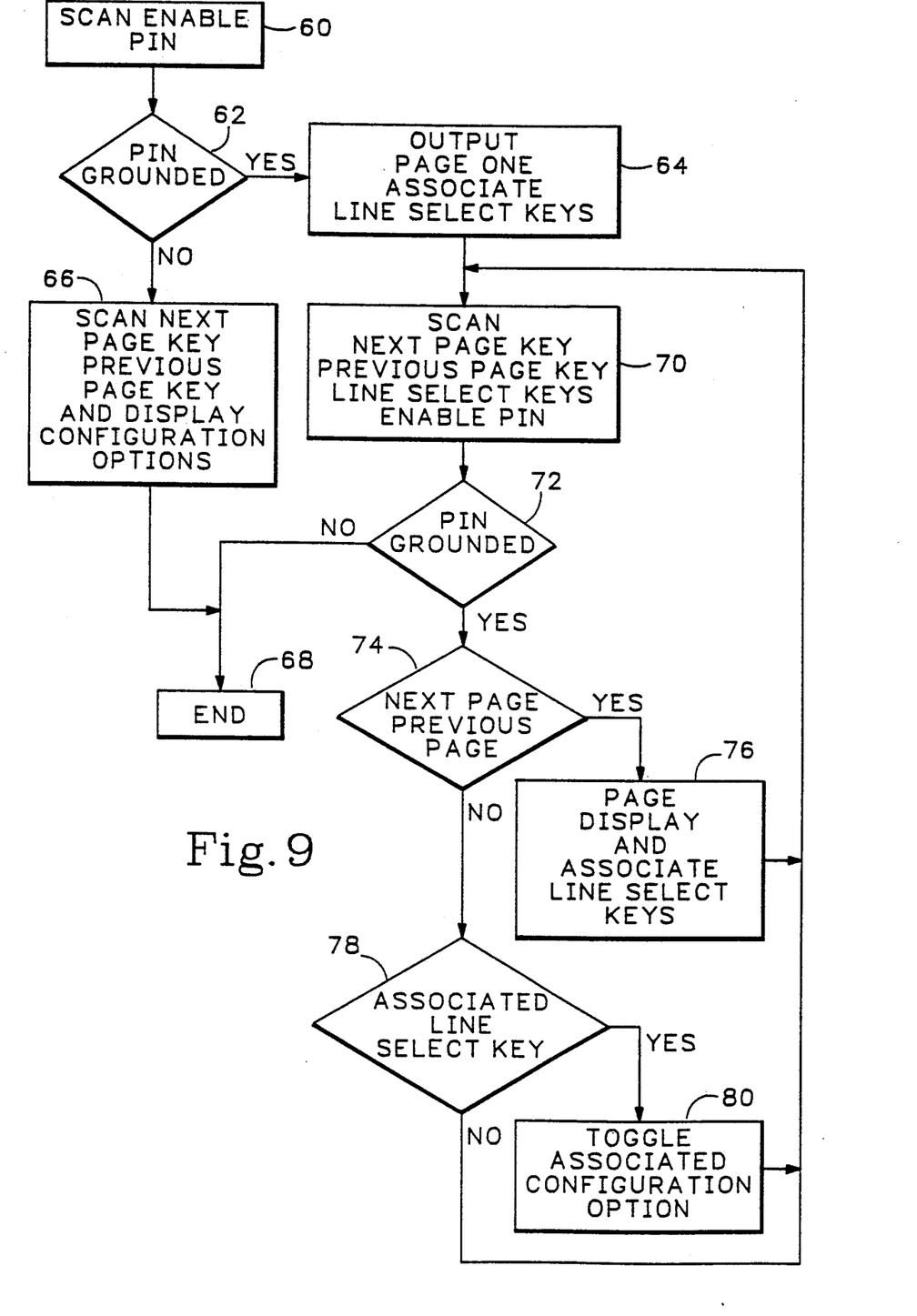
FIG. 9 is a flow chart of a program executed by the flight management computer of FIG. 1.

Modification of configuration options is accomplished by operation of enabler unit 40 and control display unit 12. In FIG. 4, selecting menu choice CONFIG DISC>, next to line select key 2R, executes a configuration options program which accesses NVRAM 32 and permits the operator of control display unit 12 to only view configuration options when enabler unit 40 is not used. However, when enable unit 40 is attached to flight management computer 10 with switch 44 in its enable position, the operator of control display unit 12 is able to toggle configuration options from one choice to the other. FIG. 9 is a flow chart showing execution of the configuration options program. Upon depressing line select key 2R to select menu choice CONFIG DISC> (FIG. 4), the program begins execution in block 60 wherein flight management computer 10 scans enable pin 52 to determine whether pin 52 is connected to ground or left open. Execution branches at block 62 depending on the status of enable pin 52. If pin 52 is connected to ground, authorization to modify configuration options is indicated as the program proceeds to block 64. If pin 52 is open, however, authorization to modify configuration options is not indicated and the program branches from block 62 to block 66 where flight management computer 10 scans NEXT PAGE function key 26 and PREVIOUS PAGE function key 28 and outputs the current status of the configuration options as shown in FIGS. 5-7. The operator of control display unit 12 selects among the screen displays of FIGS. 5-7 by depressing NEXT PAGE function key 26 and PREVIOUS PAGE function key 28. When the operator is finished viewing the current status of the configuration options, depressing line select key 6L selects the <INDEX prompt. The configuration options program terminates in block 68.

If pin 52 is connected to ground and the configuration options program reaches block 64, the operator of control display unit 12 pages through the configuration option displays shown in FIGS. 5-7 and toggles configuration options by pressing associated ones of line select keys 16. In block 64, flight management computer 10 outputs the first page of configuration options, i.e., that shown in FIG. 5, associating each configuration option of that page with one of line select keys 16. In the display of FIG. 5, five configuration options are displayed, each being associated with a corresponding one of line select keys 1R-5R. (Line select key 6R and keys 1L-6L are not associated with configuration options.) In block 70, the program instructs flight management computer 10 to scan NEXT PAGE function key 26, PREVIOUS PAGE function key 28, line select keys 16, and enable pin 52. The program remains in block 70 until one of keys 16, 26 or 28 is pressed or until pin 52 is disconnected from ground. Assuming enable pin 52 remains connected to ground, the configuration options program advances through decision block 72 to decision block 74 where it branches to block 76 if either NEXT PAGE function key 26 or PREVIOUS PAGE function key 28 was pressed. If neither of keys 26 and 28 is pressed, the program continues through decision block 74 to decision block 78 with branches to block 80 if one of line select keys 1R-5R, i.e. an associated line select key, was pressed. If line select key 6R or one of line select keys 1L-6L was pressed, i.e. a line select key not associated with a configuration option, the program returns to block 70.

When the operator presses NEXT PAGE function key 26 or PREVIOUS PAGE function key 28, the modification program reaches block 76 and a corresponding one of the screen displays shown in FIGS. 5-7 appears on CRT 24. Each time a different set of configuration options is presented on CRT 24, the configuration options program associates each configuration option of that display with one of line select keys 1R-5R with return to block 70. When the operator of control display unit 12 presses one of line select keys 16 associated with a configuration option, the program reaches block 80 wherein the status of the associated configuration option is toggled to its opposite state by writing data into NVRAM 32, there being only two possible states for each configuration option. After toggling the associated configuration option, the program returns from block 80 to block 70.

Once the configuration options are modified as desired, the operator of control display unit 12 turns switch 44 from the enable position to the disable position, thereby disconnecting enable pin 52 from ground. The configuration modification program is caused to branch from block 72 to block 68 and terminate. The configuration options, as stored in NVRAM 32, remain as modified until enabler unit 40 is again connected to flight management computer 10, placed in its enable position, and the configuration options program is executed.

A service bulletin is typically required to authorize use of enabler unit 40 for modification of configuration options of flight management computer 10. For example, if flight management computer 10 requires reconfiguration to display temperature values in Fahrenheit rather than in centigrade, the airline using flight management computer 10 requests the regulating authority to issue a service bulletin authorizing modification of the configuration option pertaining to temperature displays The service bulletin would then contain the following instructions:

1) Install enabler unit.
1a) Connect enabler unit cable.
2a) Switch enabler unit to enable position.
2) Access configuration options program.
2a) Press INIT REF function key.
2b) Press line select key 6R.
2c) Press line select key 1L.
2d) Press line select key 2R.
3) Modify temperature display option.
3a) Press line select key 2R to toggle temperature display to Fahrenheit.
4) Terminate configuration modification program.

4a) turn enabler unit to disable position.

5) Disconnect enabler unit cable from flight management computer.

According to a second embodiment of the present invention, configuration options are selected by including a block of data in the navigation database tape and loading that block into the portion of NVRAM 32 dedicated to storing the configuration options data. Airlines that receive customized navigation databases from a database supplier must provide information to the supplier concerning the type of data to be included in the database. Once the navigation database is compiled, the database supplier sends the data to the airline in a tape cartridge along with a hardcopy listing of the database. In accordance with the instant invention, the airline also provides the database supplier with a listing of the desired configuration options. This information is converted into a suitable format, placed on the tape cartridge along with the navigation database, and included in the printout of the database. When the navigation database is loaded into NVRAM 32 of flight management computer 10, the desired configuration options are loaded into NVRAM 32 for automatic selection.

Figure 10:
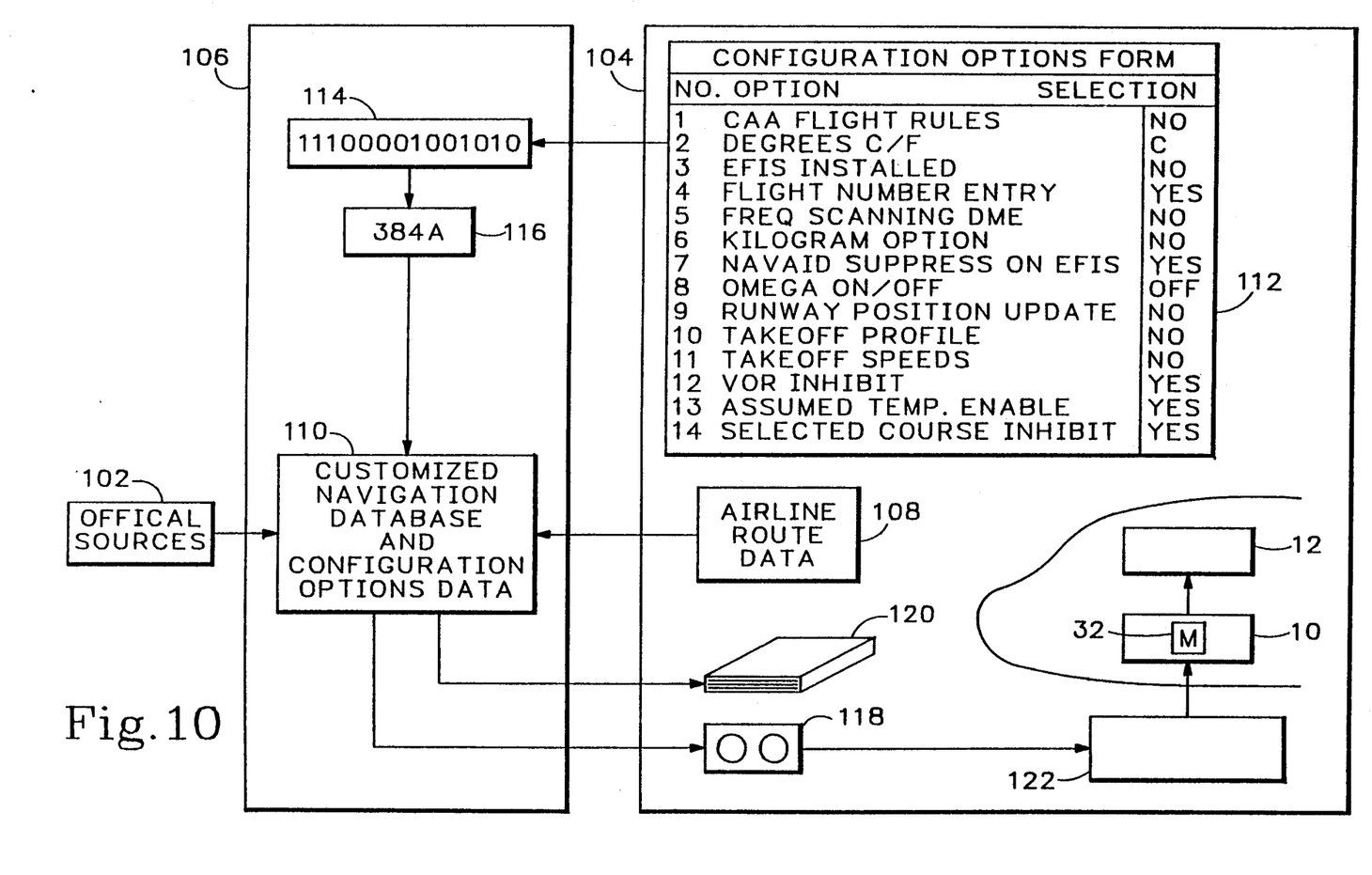
FIG. 10 is a data flow diagram showing the collection of data placed in a memory device of the flight management computer of FIG. 1.

FIG. 10 illustrates data flow from "official sources" 102 and "airline" 104 to navigation database supplier 106. Airline 104 provides route data 108 to supplier 106 while supplier 106 references official source 102, e.g. United States government aeronautical charts, to construct navigation database file 110 specifically covering the routes designated by the airline. File 110 is stored in a predefined format using blocks of hexadecimal words representing the navigation data which flight management computer 10 expects to find in the navigation database. In addition to route data 108, airline 104 provides configuration options form 112 detailing the airline's configuration option selections. Form 112 includes a line for each configuration option with a space on the right side of each line for designating a choice for each configuration option. Navigation database supplier 106 converts the information on form 112 into binary word 114 wherein each digit in binary word 114 corresponds to one configuration option. Binary word 114 is converted into hexadecimal word 116 for including as the first block of data in file 110. Supplier 106 then transfers file 110 to tape cartridge 118 and produces a hardcopy listing 120 of file 110. In printing listing 120, the hexadecimal format is converted to human readable form to serve as a manual for the database provided on cartridge 118. Airline 104 reviews listing 120 to determine whether the proper route information is included in the navigation database Airline 104 also determines whether the configuration options specified were properly incorporated into the navigation database. After receiving tape 118 and verifying its contents using listing 120, airline 104 connects navigation database loader unit 122 to flight management computer 10, inserts tape 118 into data loader unit 122, and initiates loading of the navigation database into NVRAM 32 of flight management computer 10. The first block of data presented to flight management computer 10 is the configuration options data, and computer 10 is suitably programmed to place this data in the portion of NVRAM 32 dedicated to storing such configuration options data. Control display unit 12 is then utilized to access NVRAM 32 and verify that the configuration options were properly loaded.

Because a new navigation database is loaded each time an aircraft changes hands, this method is easily incorporated into an airline's processing of new aircraft. An airline can reconfigure an entire fleet of aircraft using a single tape cartridge. The configuration options are secure against unauthorized modification because the navigation database is loaded under controlled conditions with only authorized persons having access to tape cartridge 118 or data loader unit 122.

The configuration options of flight management computer 10 can be modified without loading the navigation database. According to this method the only data included on tape 118 is the configuration options data. The connection between data loader unit 122 and computer 10 can be on a different pair of wires from those used to load the navigation database, the loading of the configuration options data being the sole function of this connection between unit 122 and flight management computer 10. Although very little information is included on the tape, the tape is only used if the configuration options required modification. Since most airlines now own data loader units for uploading navigation databases, obtaining a tape to reconfigure flight management computer 10 is relatively inexpensive compared to the aircraft down time required to rewire configuration pins.

Figure 11:
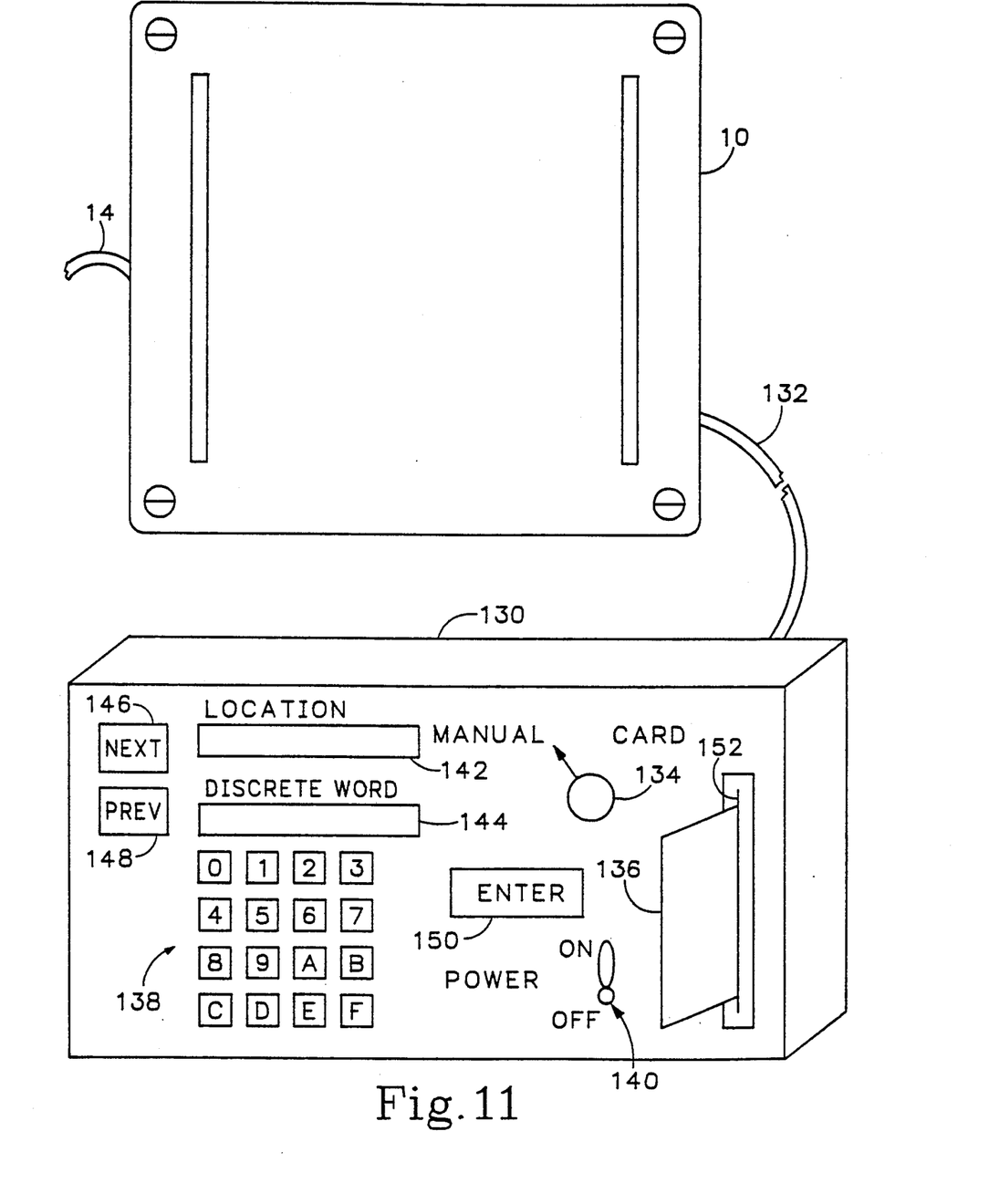
FIG. 11 is an illustration of a dedicated loader unit for providing configuration options data to the flight management computer of FIG. 1.

According to a third embodiment of the present invention as illustrated in FIG. 11, dedicated loader unit 130 is used to reconfigure flight management computer 10. In FIG. 11, dedicated configuration options data loader unit 130 connects to flight management computer 10 by way of cable 132 and permits the operator of loader unit 130 to modify data contained in NVRAM 32 (FIG. 8) of flight management computer 10. Cable 132 is similar to cable 14 of FIG. 1, operating as a digital data bus according to the ARINC 429 standard, but other standards such as DATAC are equally applicable to the present invention. Loader unit 130 includes input select switch 134 having a manual position and a card position. When switch 134 is in its card position, the operator of loader unit 130 provides configuration options data by way of a card 136; when switch 134 is in its manual position the operator of loader unit 130 enters configuration options data by way of hexadecimal keyboard 138.

To operate loader unit 130 in its manual mode, i.e., with switch 134 in its manual position, the operator connects cable 132 to flight management computer 10. Power switch 140 is operated to its on position. Upon power-up, loader unit 130 transmits an initialization word to flight management computer 10, with flight management computer 10 being programmed to recognize this word as coming from loader unit 130 and that modification of configuration options data in NVRAM 32 is authorized. Flight management computer 10 responds to the initialization word by transmitting the first configuration options memory address of NVRAM 32 as well as the data contained at that address to loader unit 130. Loader unit 130 displays this address in location display 142, displaying the data stored at that location at 144. The operator of loader unit 130 can index memory addresses forward and backward by operation of NEXT key 146 and PREV key 148, respectively, to view data in NVRAM 32. When the operator of loader unit 130 reaches a memory location requiring a change, the operator enters new data for that memory location via hexadecimal keyboard 138 followed by operation of enter key 150. Loader unit 130 transmits the new data to flight management computer 10. Flight management computer 10 writes that data into the proper location in NVRAM 32 thereby modifying the configuration options for the flight management computer. After all memory locations have been modified, the operator of loader unit 130 turns switch 140 to its off position and disconnects cable 132 from flight management computer 10.

To operate loader unit 130 in its automatic mode, the operator of loader unit 130 turns switch 134 to its card position, connects cable 132 to flight management computer 10, and turns switch 140 to its on position. Loader unit 130 transmits the initialization word to flight management computer 10. Flight management computer 10 recognizes that loader unit 130 is connected, together with the fact that modification of configuration options data is authorized. Card 136 contains new configuration options data in a medium readable by loader unit 130, e.g. a magnetic strip, punched holes, or an optic medium. The operator of loader unit 130 inserts card 136 in slot 152 of loader unit 130 after which he presses enter key 150. Loader unit 130 responds by reading the new configuration options data from card 136 and transmitting the data to flight management computer 10. Flight management computer 10 writes the data into the portion of NVRAM 32 dedicated to storage of configuration options data thereby modifying the configuration options for flight management computer 10. Enter key 150 suitably has a backlight so that when loader unit 130 begins reading card 136, enter key 150 is lighted to indicate a load is in progress. After flight management computer 10 confirms receipt of the new configuration options data, loader unit 130 turns enter key 150 off to indicate that the load is complete. The operator then turns switch 140 off and disconnects cable 132 from flight management computer 10. The details of construction of unit 130 will be apparent to those skilled in the art.

Whether loader unit 130 is operated manually or automatically, a service bulletin would conventionally be required for its use. The service bulletin includes step by step instructions detailing operation of the loader unit. If unit 130 is operated in its manual mode, the instructions direct the operator to index to a specific memory address using NEXT key 146 or PREV key 148, provide the data to be entered by way of hexadecimal keyboard 138, and press enter key 150. If loader unit 130 is to be operated in its automatic mode, the service bulletin may include card 136 with instruction to the operator to insert card 36 in slot 152, press enter key 150, and wait until lighted enter key 150 is turned off.

The present invention has been particularly illustrated as applied to a flight management computer. However, it should be understood that other configurable aircraft components may be altered in the same manner, e.g. components such as the electronic flight instrument system (EFIS), auto-throttle, autopilot and engine indicating systems. The present invention provides a secure method of reconfiguring these components without use of configuration pins.

According to the present invention several alternatives to the time consuming task of rewiring an aircraft to change configuration options are possible. Configuration options can be modified directly by way of the control display unit employing an enabler unit connected to the aircraft component requiring modification. Modification of flight management computer configuration options can alternatively be incorporated into the procedure for updating the navigation database. A dedicated loader unit may also be employed to communicate with an aircraft component and modify its configuration options. In each case, the configuration options are modified with ease and require only a few minutes of aircraft downtime, yet the configuration options data stored within the aircraft component are secure against unauthorized modification since each method and apparatus of the present invention provides measures against unauthorized alteration. In accordance with the present invention, aircraft components need not employ configuration pins, and therefore the number of configuration options is not limited by the number of configuration pins located on the aircraft component. Aircraft wiring is simplified inasmuch as dedicated wires are not utilized to deliver discrete signals to configuration pins and the possibility of confusion due to miswiring of the aircraft is avoided.

While several embodiments of the present invention have been shown and described, it will be apparent to those skilled in the art that many changes and modifications may be made without departing from the invention in its broader aspects. For example, the storage medium used to deliver the navigation database is described in one embodiment as a tape cartridge; however, other systems are available such as magnetic disks and optical disks. The re-programmable non-volatile memory of the flight management computer is described as NVRAM, but the present invention is applicable to any re-programmable non-volatile memory including bubble memory and electrically erasable programmable read only memory (EEPROM). The appended claims are therefore intended to cover all such changes and modifications as fall within the true spirit and scope of the invention.

I claim:

1. A method of selecting configuration options for a programmable aircraft component adapted for airborne use and including a reprogrammable non-volatile memory device the state of which determines the selection of configuration options for said aircraft component, the method comprising:

providing said aircraft component with at least one configuration option having a first state and a second state;

programming said aircraft component to permit programming of said memory device to select between said first and said second state of said configuration option only when authorization to program said memory device is indicated;

indicating said authorization to permit said programming of said memory device wherein said indicating step comprises connecting an enabling device to said aircraft component, said enabling device having an enable state and a disable state, said indicating step further comprising setting said enabling device to the enable state;

transmitting configuration option data selection to said aircraft component;

writing configuration option data selection into said memory device following an indication that said programming of said memory device is authorized;

withdrawing indication of said authorization to permit said programming of said memory device; and programming said aircraft component to permit reading of said memory device to view the state of said configuration option without regard to whether authorization to program said memory device is indicated.

2. The method according to claim 1 wherein said step of setting said enabling device to the enable state comprises the step of applying a given reference voltage to an enable pin of said aircraft component, said aircraft component being programmed to scan said enable pin and permit further programming of said memory device when said enable pin is connected to said given reference voltage.

3. The method according to claim 1 wherein said step of transmitting configuration option data to said aircraft component includes the step of transmitting a navigation database to said aircraft component.

4. The method according to claim 1 wherein said step of setting said enabling device to the enable state comprises the step of transmitting authorization data to said aircraft component and said aircraft component is programmed to recognize said authorization data as indicating authorization to further program said memory device.

5. The method according to claim 1 wherein said withdrawing step comprises setting said enabling device to the disable state.

6. The method according to claim 1 wherein said withdrawing step comprises disconnecting said enabling device from the aircraft component.

7. The method according to claim 1 wherein said enabling device comprises an external switch box adapted to connect to the aircraft component.

8. An aircraft comprising:
a configurable component having at least one configuration option, said option having a first state and a second state, said first and second states of said configuration option governing operation of said configurable component;
configuration means for choosing between said first and said second states of said configuration option, said configuration means including controlling means for governing whether said configuration means is enabled for choosing between said first and said second states, wherein said configuration means comprises a data loader unit external to said configurable component; and
means coupling said configuration means to said configurable component,
wherein said configuration means is enabled by said controlling means to permit choosing between said first and said second states of said configuration option only when authorization to permit choosing is indicated by said controlling means.

9. An aircraft according to claim 8 wherein said configuration means comprises means for reading a pre-stored selection and transmitting said pre-stored selection to said configurable component to choose between said first and second states of said configuration option, and wherein said transmission indicates authorization to permit said choosing.

10. An aircraft according to claim 9 wherein said pre-stored selection is transmitted in conjunction with a navigation database.

11. An aircraft according to claim 8 wherein said controlling means indicates authorization by transmitting an initialization signal to said configurable component via said coupling means.

12. An aircraft according to claim 8 wherein said configuration means comprises means for reading a pre-stored selection and transmitting said pre-stored selection to said configurable component to choose between said first and second states of said configuration option and wherein said controlling means indicates authorization by transmitting an initialization signal to said configurable component via said coupling means.

13. An aircraft according to claim 12 wherein said pre-stored selection is transmitted in conjunction with a navigation database.

14. An aircraft configuration system for configuring options governing the operation of an aircraft comprising:
a flight management computer for directing operation of the aircraft, said flight management computer implementing a plurality of configuration options concerning portions of the operation of the aircraft, each of said options having at least two selectable states;
a configuration device adapted to be connected to said flight management computer, said configuration device being operative to enable selection for a plurality of said options of one of said at least two states; and
an enabler means external to said flight management computer and to said configuration device, said enabler means being adapted to be removed from an area of use of said flight management computer, said enabler means having an enable mode and a disable mode and adapted to be connected to said flight management computer,
wherein said configuration device permits viewing of the states of said options irrespective of said enabler means and wherein said configuration device is prevented from selecting ones of said at least two states unless said enabler means is connected to said flight management computer and is in the enable mode.

15. An aircraft configuration system according to claim 14 wherein said flight management computer includes an enable pin, said enabler means comprises a manually operated electrical switch, and the connection between said flight management computer and said enabler means comprises a connection between a first terminal of said switch and said enable pin.

16. An aircraft configuration system according to claim 15 wherein a second terminal of said switch is connected to ground relative to said flight management computer, wherein said enabler means is in the disable position when said switch is in an open state as between said first and second terminals and said enabler means is in the enable position when said switch is in a closed state as between said first and second terminals, thereby electrically connecting said enable pin to ground.

17. An aircraft configuration system according to claim 14 further comprising:
a data loader unit adapted to interconnect with said flight management computer for uploading configuration data thereto; and
a data storage medium for supplying upload data to said data loader unit,
wherein said enabler means comprises a data portion stored within said data storage medium and wherein said flight management computer is adapted to recognize said data portion as indicating that said enabler means is in the enable mode.

* * * * *